(12) United States Patent
Borkholder (10) Patent No.: US 12,503,057 B2
(45) Date of Patent: Dec. 23, 2025

(54) ANTI-WHIP RECEIVER

(71) Applicant: Gen-Y Creations, LLC, Nappanee, IN (US)

(72) Inventor: Carl J. Borkholder, Nappanee, IN (US)

(73) Assignee: Gen-Y Creations, LLC, Nappanee, IN (US)

( * ) Notice: Subject to any disclaimer, the term of this patent is extended or adjusted under 35 U.S.C. 154(b) by 65 days.

(21) Appl. No.: 18/672,180

(22) Filed: May 23, 2024

(65) Prior Publication Data

US 2025/0360880 A1   Nov. 27, 2025

(51) Int. Cl.
| B60D 1/50 | (2006.01) |
| B60R 9/06 | (2006.01) |
| B60R 9/10 | (2006.01) |

(52) U.S. Cl.
CPC ............ B60R 9/06 (2013.01); *B60D 1/50* (2013.01); *B60R 9/10* (2013.01)

(58) Field of Classification Search
CPC ... B60D 1/50; B60D 1/42; B60D 1/44; B60D 1/46; B60D 1/32; B60D 1/325; B60D 1/322; B60D 1/075; B60D 1/249; B62D 53/0885; B60R 9/06; B60R 9/10
See application file for complete search history.

(56) References Cited

U.S. PATENT DOCUMENTS

| 4,773,668 | A | 9/1988 | Muonro | |
|---|---|---|---|---|
| 5,823,560 | A | 10/1998 | Van Vleet | |
| 6,116,631 | A | 9/2000 | Logan et al. | |
| 6,494,478 | B1 | 12/2002 | MacKarvich | |
| 7,044,493 | B1 | 5/2006 | Wilson | |
| 7,093,845 | B1 | 8/2006 | Fast | |
| 7,377,536 | B2 * | 5/2008 | Rehme | B60D 1/065 280/483 |
| 9,505,281 | B1 * | 11/2016 | Borkholder | B60D 1/24 |
| 10,493,811 | B2 * | 12/2019 | Borkholder | B60D 1/50 |
| 10,639,950 | B2 * | 5/2020 | Borkholder | B60D 1/58 |
| 11,685,206 | B2 * | 6/2023 | Fisher | B60D 1/50 280/511 |
| 12,097,732 | B2 * | 9/2024 | Borkholder | B60D 1/065 |
| 2003/0178811 | A1 * | 9/2003 | Buckner | B62D 53/0842 280/483 |
| 2005/0263984 | A1 | 12/2005 | Gurtler | |

* cited by examiner

*Primary Examiner* — Corey N Skurdal
(74) *Attorney, Agent, or Firm* — Sanders Pianowski LLP (57) ABSTRACT

An anti-whip receiver has a fixed portion that is coupled to a moveable receiver. The moveable receiver can move between an unloaded and a loaded position where it rotates and slides with respect to the fixed portion. The fixed portion has a torsion element that is coupled to one end of a link arm. The other end of the link arm is connected to the moveable receiver so that downward movement is resiliently resisted by the torsion element. The moveable receiver is also slidable with respect to the fixed portion with a pin that is located in a slot.

20 Claims, 11 Drawing Sheets

ANTI-WHIP RECEIVER

BACKGROUND OF THE INVENTION

The present disclosure relates to "bumper pull" attachments that are entirely supported by the vehicle, including cargo platforms, bike and kayak racks, and mobility scooter platforms. For clarity, this relates to attachments at the rear of the vehicle (typically affixed at or behind the rear bumper). When driving with an attachment attached to the rear of the vehicle, transient forces are transmitted from the vehicle to the attachment, such as traveling over speed bumps, railroad tracks, or bumpy roads. When traveling over a bump, the upward motion of the rear of the vehicle with the attachment causes a "whip" motion that is a combination of upward and rotational forces, quickly followed by downward and rotational forces in the opposite direction. These transient forces create excessive stress in the attachment, causing premature failure and/or unexpected loss of any payload being carried. Other devices include torsion and shock-absorbing elements, but these are focused on tongue weight (forces in the vertical direction) or stop/start inertia (forces in the direction of travel). In addition, some devices are able to move only in one direction, such as U.S. Pat. No. 6,116,631 (vertical linear travel) or U.S. Pat. No. 6,494,478 (rotational). For sufficient damping of the "whip" motion, significant travel may be required. However, the attachments at issue, such as bike racks have enough height above the attachment point that significant rotation about a close pivot point (such as shown in U.S. Pat. No. 6,494,478) would cause the attachment to periodically contact the vehicle, possibly shattering a rear window or damaging a body panel. Other devices allow translation vertically and horizontally, such as U.S. Pat. No. 5,823,560, but take up considerable space. In addition, these devices are unable to handle the unique dynamic whip forces. Therefore, an improved device is needed.

SUMMARY OF THE INVENTION

The present disclosure describes an anti-whip receiver that attaches to a vehicle either through an existing receiver or as part of a frame-mounted receiver. The anti-whip receiver has a fixed portion with a transverse torsion tube affixed to a first side and a second side. A torsion bar is resiliently held within the torsion tube and rotatable about a torsion axis. A torsion arm is affixed to the torsion bar and is rotatable therewith. The first and second sides each have a slot spaced from the torsion axis by a first distance and an arm pivot spaced from the torsion axis by a second distance. A link arm is rotatable with respect to the fixed portion about the arm pivot, with one end of said link arm being coupled to the torsion arm. A moveable receiver is located between the sides and is slidably coupled to the fixed portion at a sliding pin which is located in the slots. The moveable receiver is also rotatably affixed to another end of the link arm at a rotating axis. The rotating axis is moveable with respect to the torsion axis when the torsion bar rotates. The receiver is moveable between a loaded and an unloaded position. The unloaded position is defined by the sliding pin being located at one end of the slot and the link arm being at a first rotational position. The loaded position is defined by the sliding pin being located at an opposite end of the slot and the link arm being at a second rotational position.

DESCRIPTION OF THE PREFERRED EMBODIMENT

Figure 9:
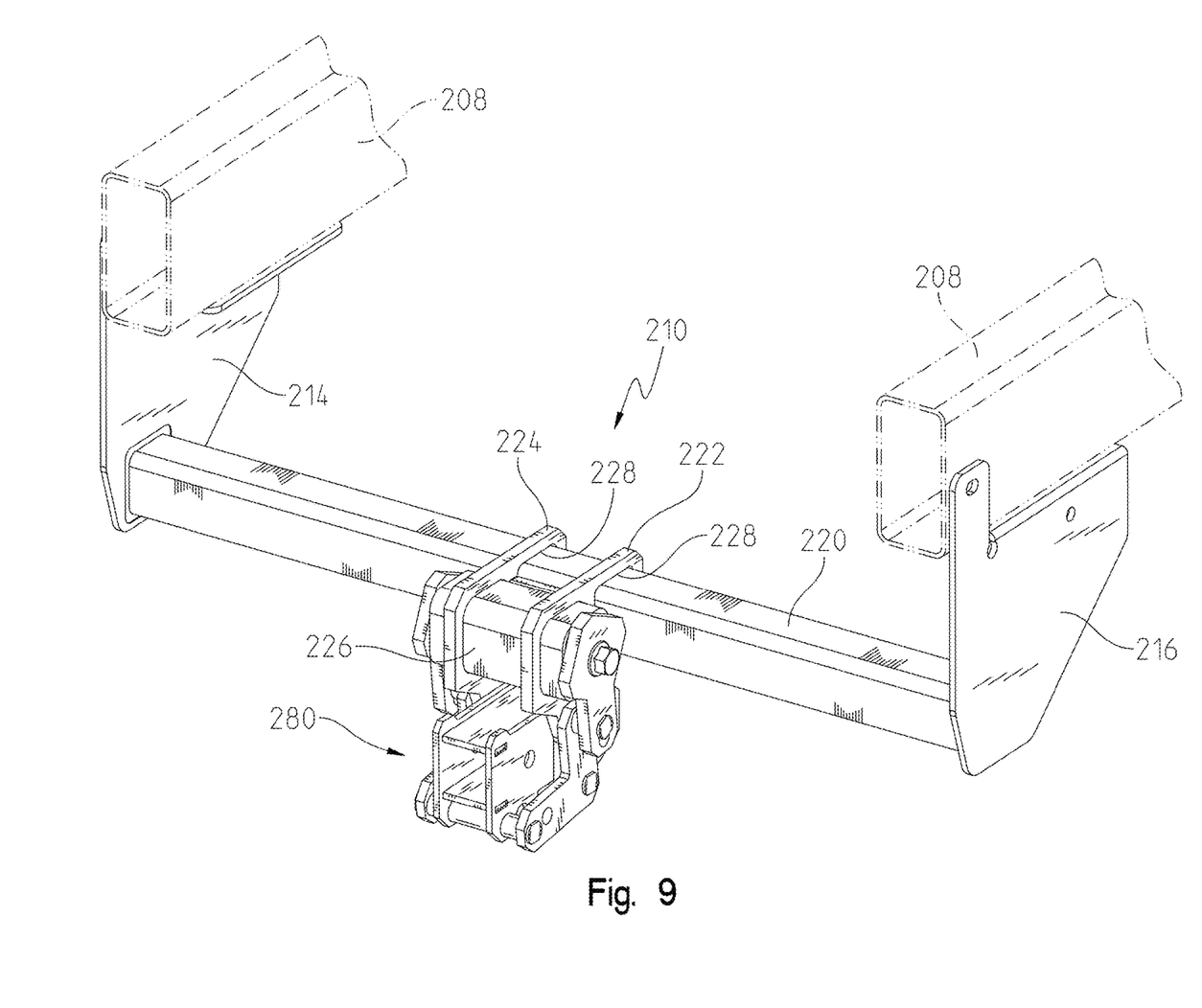
FIG. 9 is a rear isometric view of a frame-mounted embodiment of the anti-whip receiver.
Figure 10:
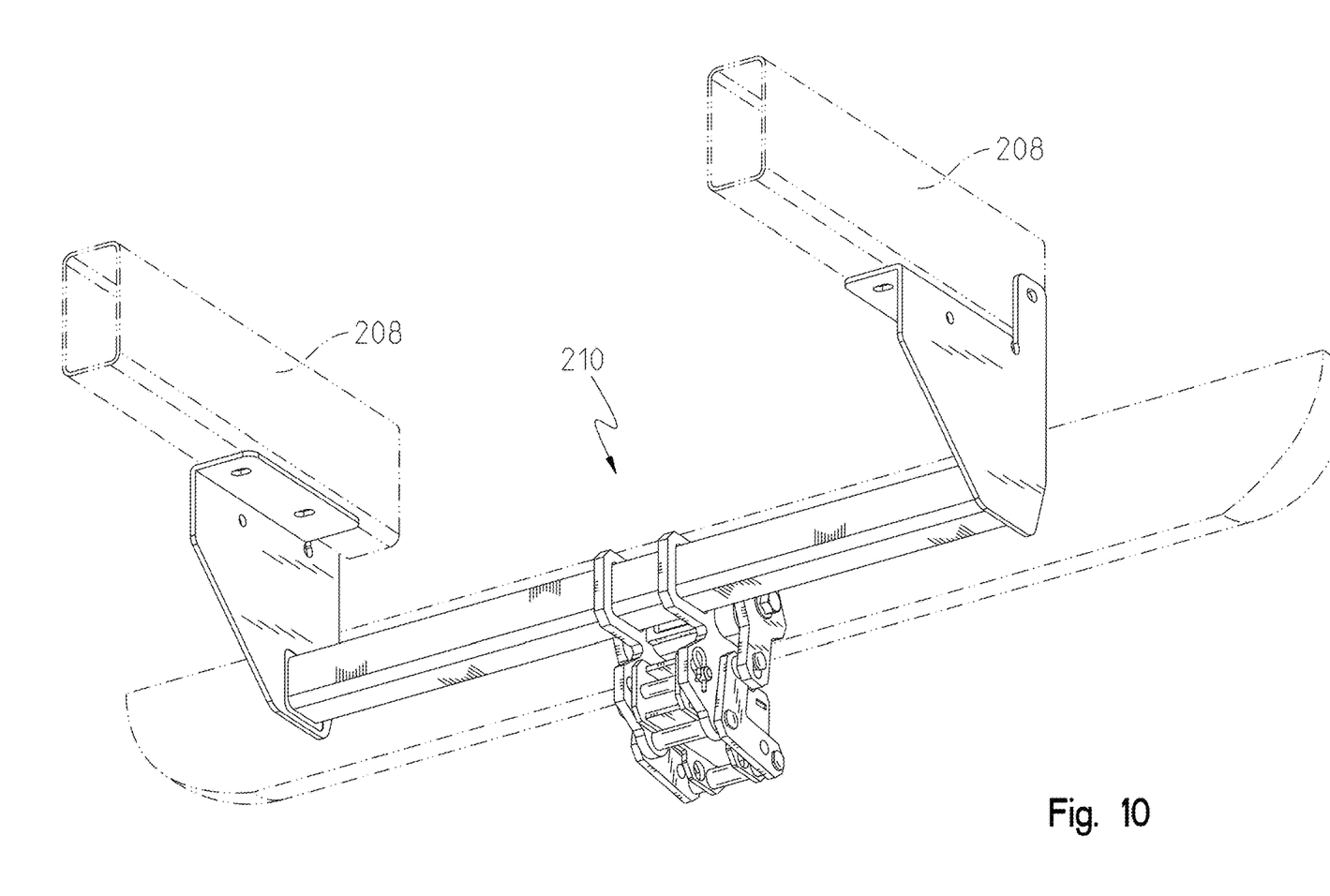
FIG. 10 is a front isometric view of the frame-mounted embodiment of the anti-whip receiver in FIG. 8.

A draw bar embodiment of an anti-whip receiver 10 is shown in FIGS. 1-6 and a frame-mounted embodiment of the anti-whip receiver 210 is shown in FIGS. 9-10. The anti-whip receivers 10, 210 share many components and operation, and differ only in how they are attached to the vehicle. Anti-whip receiver 10 can be easily removed for storage as it attaches using a draw bar 20 to an existing vehicle-mounted hitch receiver (not shown). Anti-whip receiver 210 is intended to be permanently mounted since it attaches directly to the vehicle's frame 208 using frame mounting brackets 214, 216. Receiver 10, 210 is rigidly attached to the vehicle, with the term "rigidly" to include typical movement allowed between the receiver and vehicle, particularly with the draw bar connection used with anti-whip receiver 10.

Figure 4:
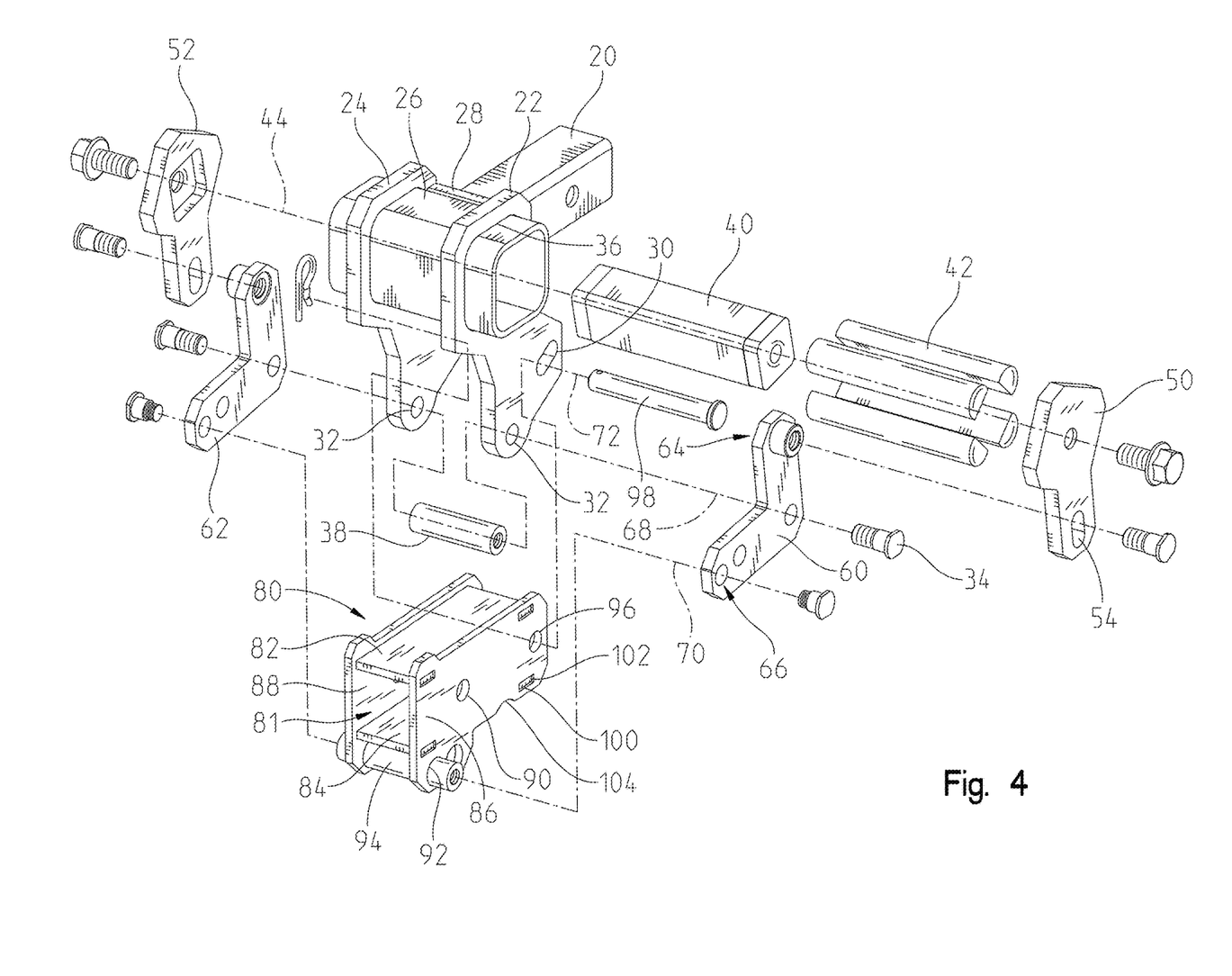
FIG. 4 is an exploded rear isometric view of the receiver in FIG. 1.
Figure 5:
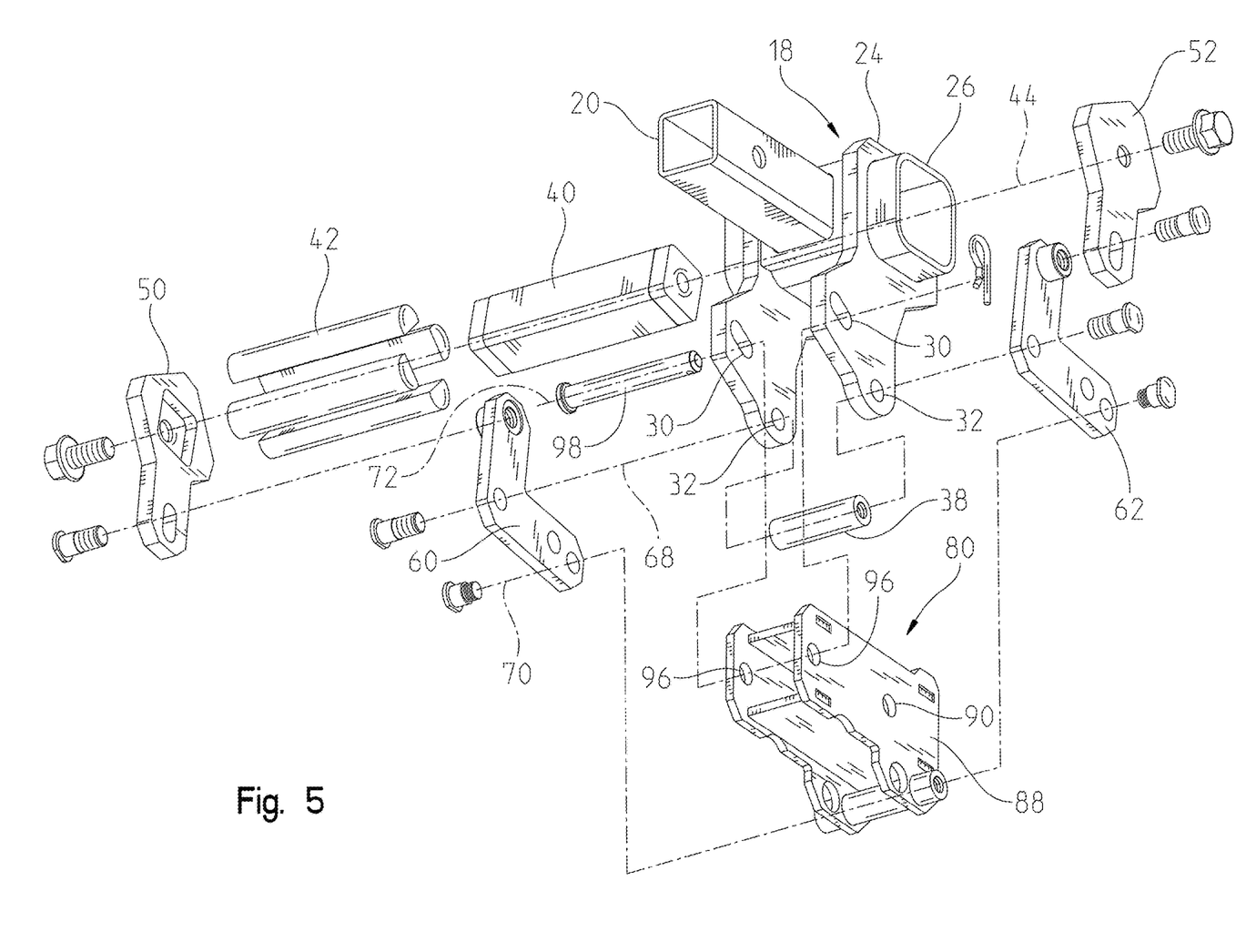
FIG. 5 is an exploded front isometric view of the receiver in FIG. 1.

The draw bar anti-whip receiver 10 has a fixed portion 18 that consists of the draw bar 20 that is affixed to a first side 22, a second side 24, and a torsion tube 26. A shank reinforcement 28 is affixed between the draw bar 20 and the sides 22, 24 and torsion tube 26. The torsion tube 26 is perpendicular to the draw bar 20 and extends through the first and second sides 22, 24. As can be seen in FIGS. 4 and 5, the first and second sides 22, 24 are identical, each having a slot 30 and an arm pivot 32. As shown in FIGS. 4 and 5, the slot 30 is closer to the torsion tube 26 than the arm pivot 32. The torsion tube 26 extends through a torsion tube aperture 36 in each side 22, 24. The arm pivot 32 holds an arm pivot pin 34 that attaches to a stop pin 38 that extends across both sides 22, 24. The slots 30 are angled upward in a direction away from the arm pivot 32.

The torsion tube 26 holds a torsion bar 40 that is surrounded by resilient cords 42 that urge the torsion bar 40 to a resting position while still allowing rotation about a torsion axis 44. The torsion axis 44 is centered with respect to both the torsion bar 40 and torsion tube 26. Affixed at the terminal ends of the torsion bar 40 are a first torsion arm 50 and a second torsion arm 52. The torsion arms 50, 52 each have a slot 54 that allow coupling to link arms 60, 62.

The link arms 60, 62 are pivotably attached to first and second sides 22, 24 respectively and rotate on a link arm axis 68 about the arm pivot pins 34 that are affixed to arm pivots 32. The link arm axis 68 is at a fixed distance from and parallel to the torsion axis 44. The link arms 60, 62 are L-shaped with a torsion end 64 coupled to the slot 54 in the torsion arm and a receiver end 66 that is coupled to a moveable receiver 80. In the embodiment shown herein, the receiver end 66 is longer than the torsion end 64.

Figure 7:
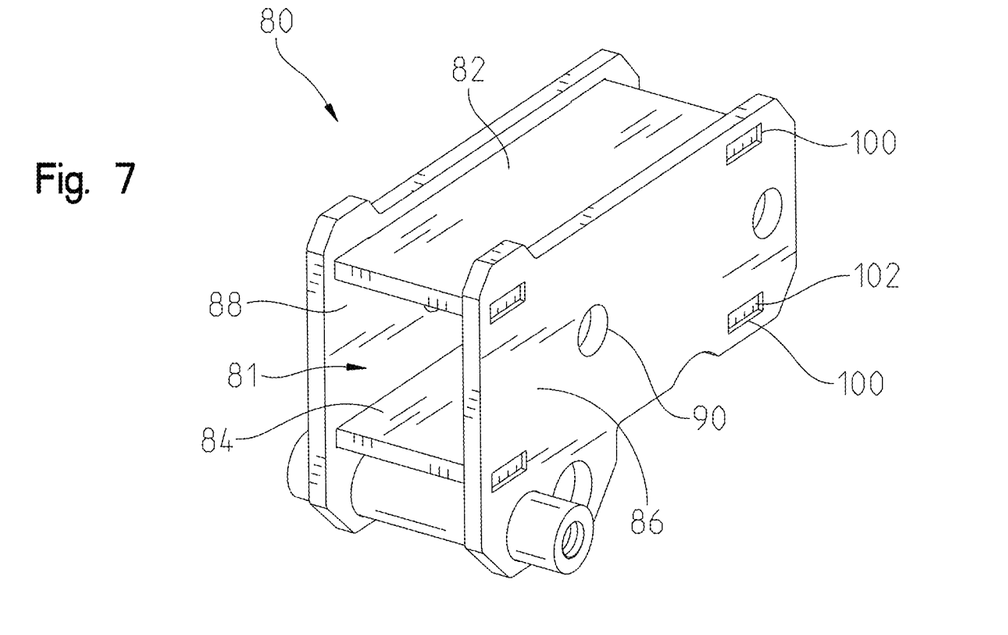
FIG. 7 is a rear isometric view of the moving portion shown in FIG. 1.
Figure 8:
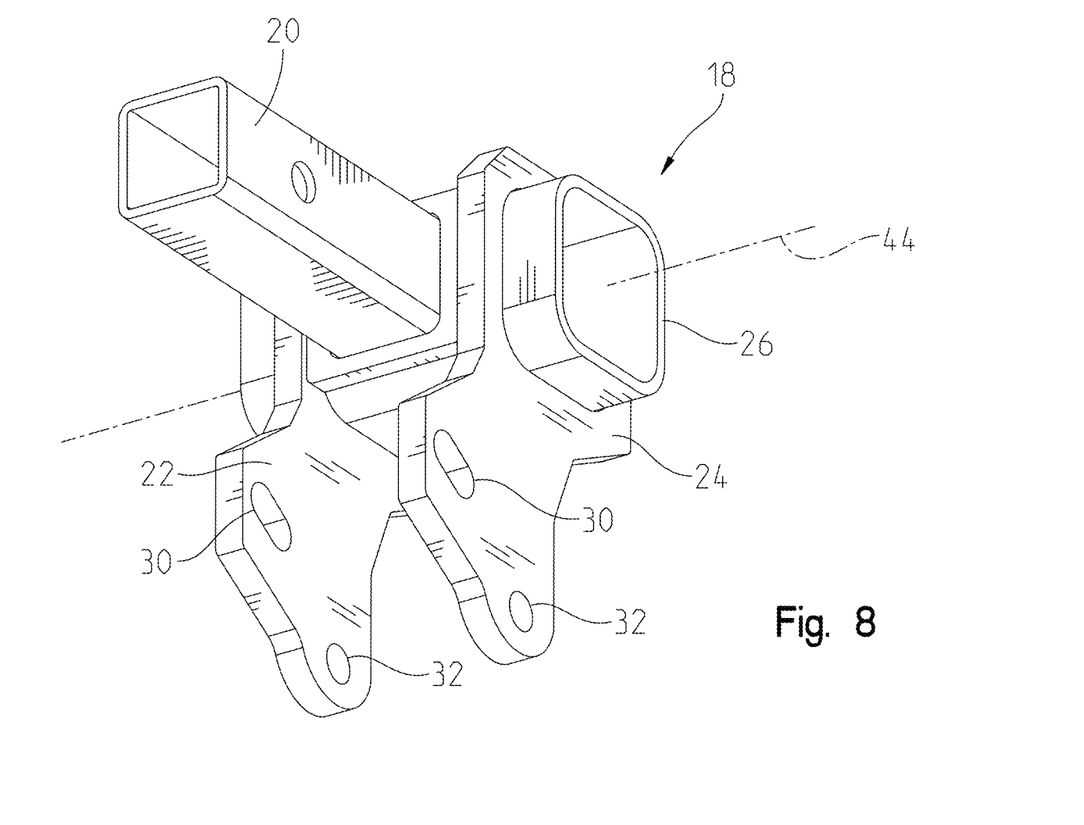
FIG. 8 is a front isometric view of the fixed portion shown in FIG. 2.
Figure 11:
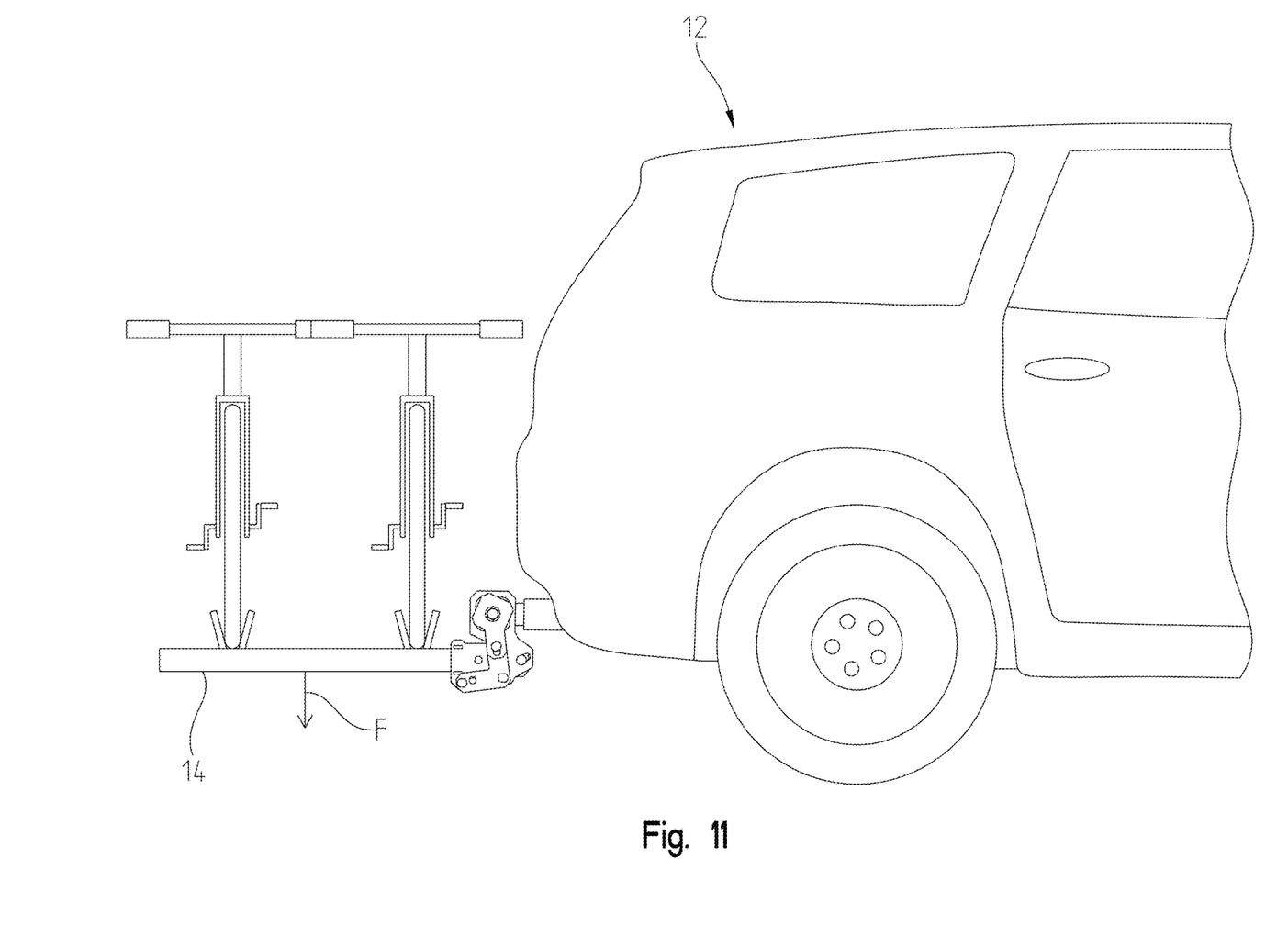
FIG. 11 is a right side view of the draw bar embodiment of the anti-whip receiver as affixed between a towing vehicle and an accessory rack.

As shown in FIG. 7, the moveable receiver 80 is an assembly of flat components that are affixed together to form a receiving cavity 81, such as a top wall 82, bottom wall 84, first side wall 86, and a second side wall 88. The moveable receiver 80 is held between the sides 22, 24, torsion tube 26, and stop pin 38 and can retain a square draw bar for an accessory attachment 14. As shown in FIG. 11, the accessory attachment 14 hangs beyond the rear of the vehicle 12 and does not have other freedom of movement (unlike a hitch ball to a trailer coupler). Therefore, forces F from the accessory attachment 14 are further behind the vehicle 12 than with a typical hitch ball connection. The side walls 86, 88 are identical so only one will be described in detail. Side wall 86 has a hitch pin aperture 90 to receive a lock pin (not shown) to affix the attachment 14 to the moveable receiver 80. There may be some small amount of movement between the receiver 80 and attachment 14 due to tolerances and fitment, but the attachment 14 is still considered to be rigidly affixed to the moveable receiver 80. A pivot aperture 92 is located below the receiving cavity 81 that receives a shaft 94 that extends across and beyond both side walls 86, 88. A rear aperture 96 holds a transverse pin 98 that extends across the rear of the receiving cavity 81 and through slots 30 in the sides 22, 24. A sliding axis 72 is centered about the transverse pin 98. The side walls 86, 88 have slot apertures 100 that receive tabs 102 on the top and bottom walls 82, 84. The side walls 86, 88 also have a notch 104 that allows additional travel of the moveable receiver 80 before it contacts the stop pin 38.

The moveable receiver 80 is coupled to the fixed portion 18 in two places, the open end (or first end) and closed end (or second end). At the closed end, the transverse pin 98 couples the moveable receiver 80 through a sliding connection allowed by the slots 30. At the open end (opposite the closed end), the shaft 94 is rotatably coupled to the link arms 60, 62, which allows rotation between the link arms 60, 62 and moveable receiver 80 about a rotating axis 70. The rotating axis 70 moves by rotating about the link arm axis 68 with the rotation of the link arms 60, 62. Because the transverse pin 98 only allows movement along the slots 30, the open end can only pivot in an arc based on the angle of the link arms 60, 62. As force in the downward direction is applied to the moveable receiver 80, the open end rotates downwardly and the closed end moves rearward and further from the draw bar 20 at the angle of the slot 30. This is shown by the arrows in FIG. 3A.

Figure 1:
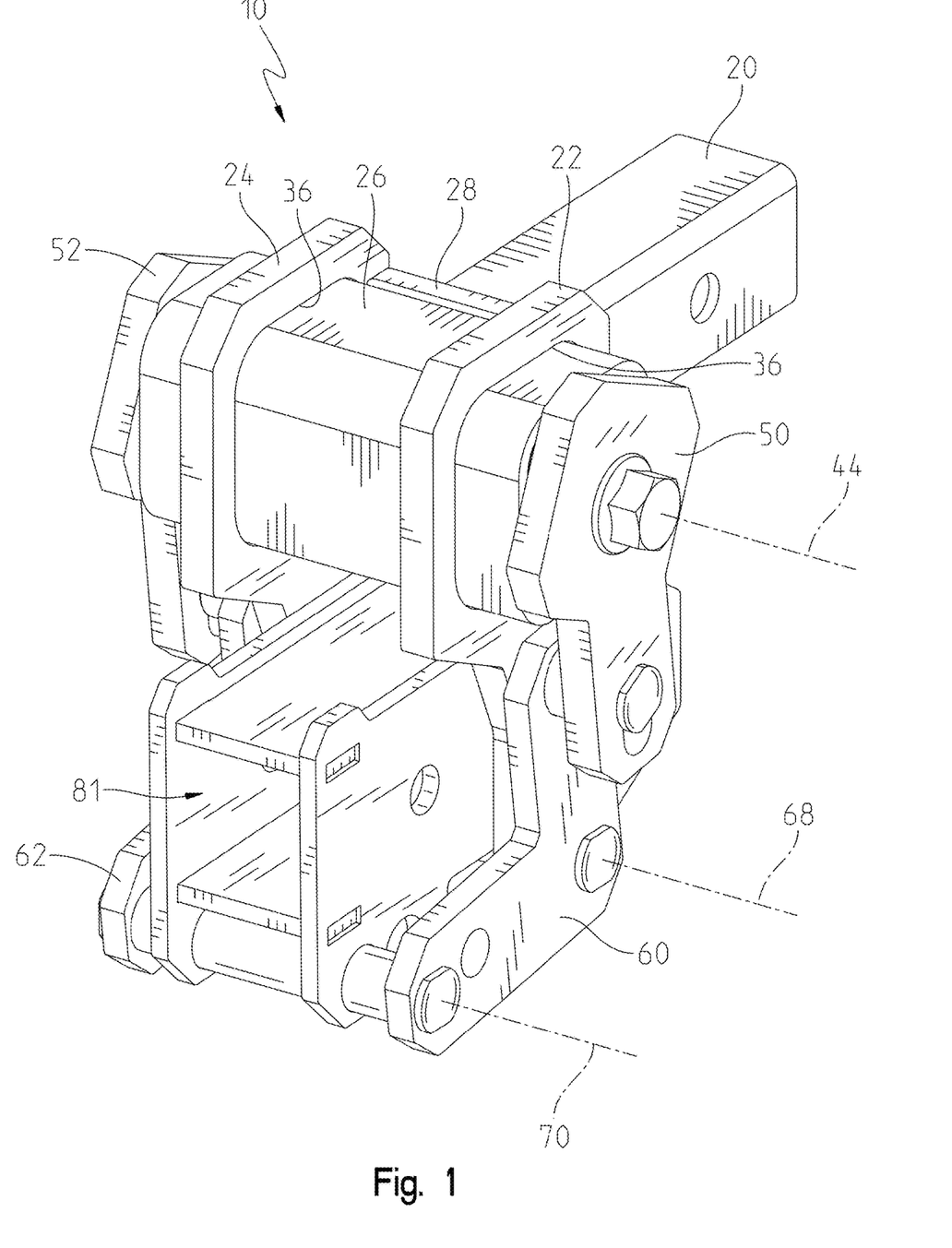
FIG. 1 is a rear isometric view of a draw bar embodiment of an anti-whip receiver.
Figure 2:
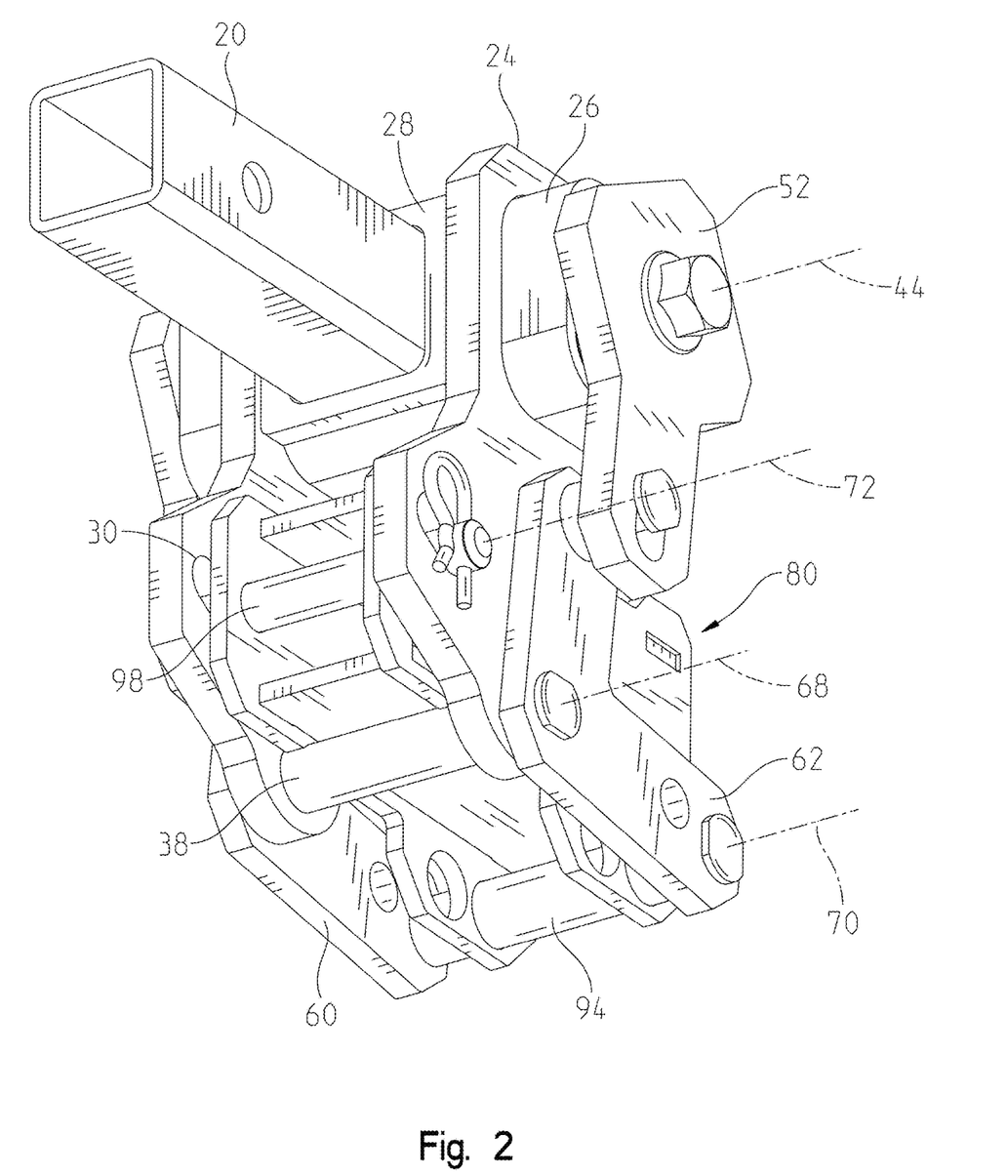
FIG. 2 is a front isometric view of the draw bar anti-whip receiver in FIG. 1.
Figure 3A:
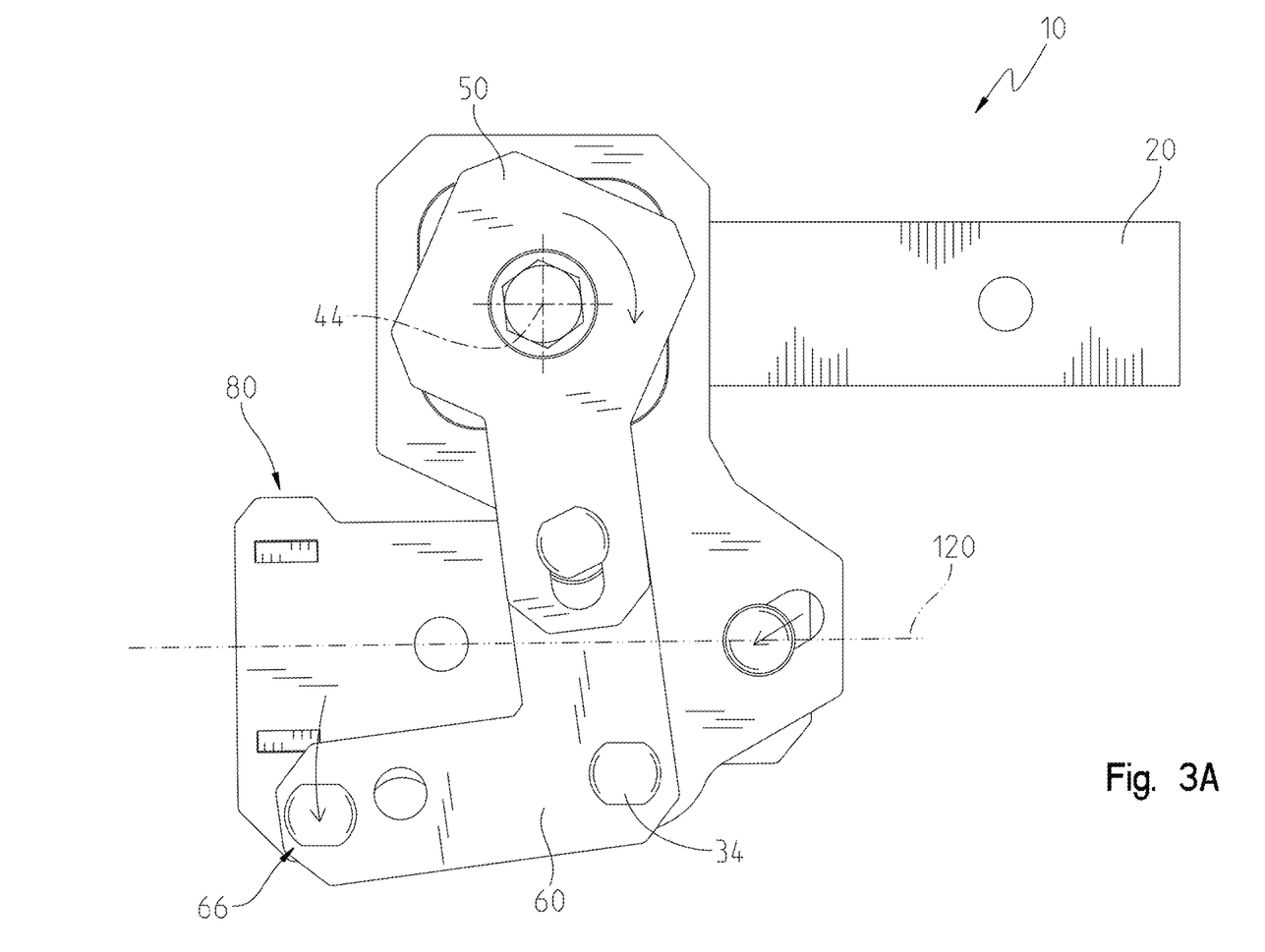
FIG. 3A is a right side view of the receiver in FIG. 1 in the loaded position.
Figure 3B:
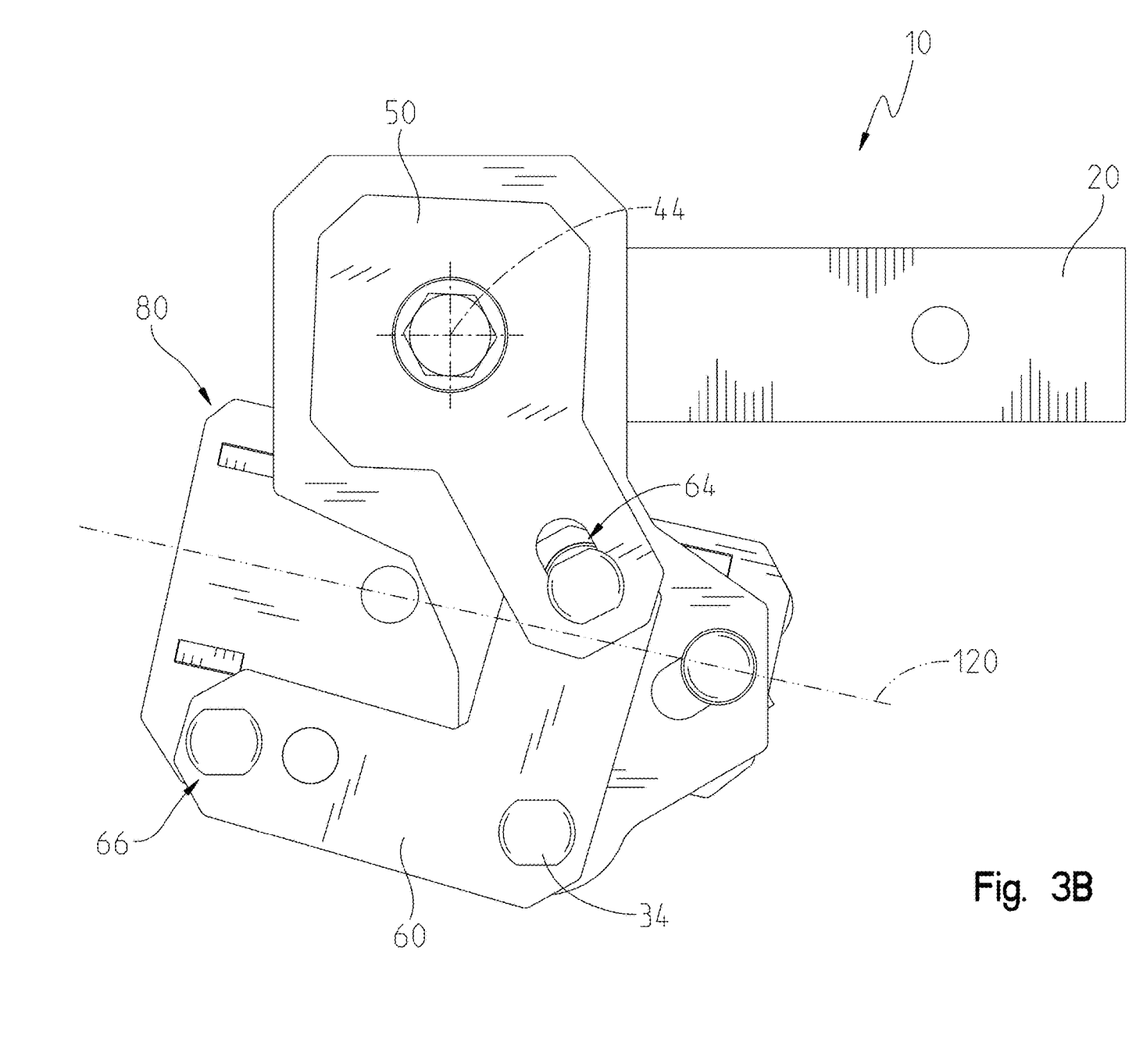
FIG. 3B is a right side view of the receiver in FIG. 1 in the unloaded position.
Figure 6:
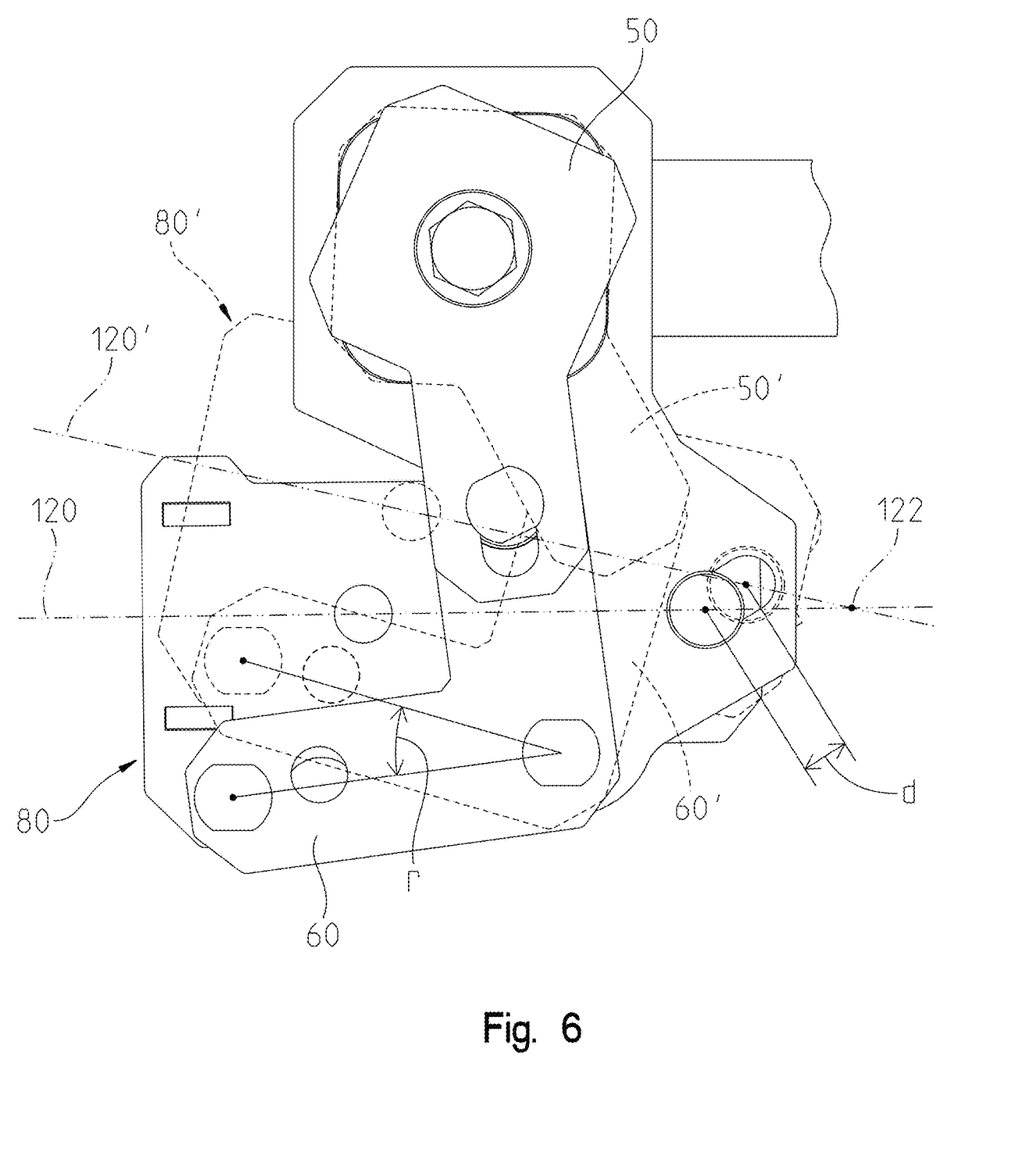
FIG. 6 is a right side view of the receiver in FIG. 1 showing the loaded and unloaded positions.

As shown in FIGS. 3A, 3B, and 6, the moveable receiver 80 can move between a loaded position (shown in FIG. 3A) and an unloaded (or whip) position (shown in FIG. 3B). In the unloaded position, the moveable receiver 80 is angled with respect to the draw bar 20, demonstrated by a receiver plane 120. In this position, there are no load forces on the moveable receiver 80 and the torsion bar 40 and torsion arms 50, 52 are in a neutral position. At the same time, the transverse pin 98 is located in one end of the slots 30 and the link arms 60, 62 are rotated upward and towards the torsion axis 44. In the loaded position, the receiver plane 120 is parallel or nearly parallel to the draw bar 20. At the same time, the transverse pin 98 is located in the opposite end of the slots 30 and the link arms 60, 62 are rotated down and away from the torsion axis 44. As can be seen in FIG. 6, the receiver plane 120' of the moveable receiver 80' in the unloaded position intersects the receiver plane 120 in the loaded position at a point 122 outside of the mechanism. Another way to describe the complex movement of the moveable receiver 80 is link arms 60, 62 have an arcuate path (shown as "r" in FIG. 6) and the interface of the transverse pin 98 with slots 30 only allow linear movement (shown as "d" in the same FIG.), so the movement of the moveable receiver 80 (between the loaded and unloaded position) is neither purely linear or purely rotational. In any event, the moveable receiver 80 does not rotate about the torsion axis 44. While the slots 30 in the embodiments shown herein are straight, other profiles or curves are contemplated.

The frame-mounted embodiment of the anti-whip receiver 210 has a transverse bar 220 that extends between the frame mounting brackets 214, 216. The transverse bar 220 extends through bar apertures 228 in the first and second sides 222, 224. Aside from how they attach to the transverse bar 220, the first and second sides 222, 224 are otherwise identical to the first and second sides 22, 24, including a torsion tube 226 and moveable receiver 280.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An anti-whip receiver comprising:
   a fixed portion having a transverse torsion tube affixed to a first side and a second side, a torsion bar resiliently held within said torsion tube and rotatable about a torsion axis, a torsion arm is affixed to said torsion bar and rotatable therewith;
   said first and second sides each having a slot spaced from said torsion axis by a first distance and an arm pivot spaced from said torsion axis by a second distance;
   a link arm rotatable with respect to said fixed portion about said arm pivot, one end of said link arm is coupled to said torsion arm; and
   a moveable receiver located between said sides and slidably coupled to said fixed portion at a sliding pin located in said slots, said moveable receiver rotatably affixed to another end of said link arm at a rotating axis, said rotating axis moveable with respect to said torsion axis when said torsion bar rotates.

2. The anti-whip receiver in claim 1, wherein said receiver is moveable between a loaded and an unloaded position, said unloaded position defined by said sliding pin located at one end of said slot and said link arm at a first rotational position, said loaded position defined by said sliding pin located at an opposite end of said slot and said link arm at a second rotational position.

3. The anti-whip receiver in claim 2, wherein said arm pivot extends between said first and second sides, said receiver contacts said arm pivot in said loaded position.

4. The anti-whip receiver in claim 2, wherein when said moveable receiver is in said unloaded position, said rotating axis is closer to said torsion axis than when said moveable receiver is in said loaded position.

5. The anti-whip receiver in claim 1, when said rotating axis rotates about said arm pivot, said sliding pin slides in said slot.

6. The anti-whip receiver in claim 1, wherein said second distance is greater than said first distance.

7. The anti-whip receiver in claim 1, wherein said receiver is slidably rotatable with respect to said fixed portion between a loaded and an unloaded position.

8. An anti-whip receiver for attaching between a towing vehicle and an accessory rack, said anti-whip receiver comprising:
a fixed portion for rigidly attaching to said vehicle;
a moveable receiver for rigidly attaching to said accessory rack, said moveable receiver slidably rotatable with respect to said fixed portion between an unloaded position and a loaded position, said moveable receiver having a link end and a sliding end opposite said link end, said sliding end slidably coupled to said fixed portion, said link end rotatably coupled to said fixed portion at a rotating axis; and
a torsion portion having a torsion tube and a torsion bar resiliently rotatable with respect to said torsion tube about a torsion axis, said torsion portion connected between said moveable receiver and said fixed portion to urge said moveable receiver towards said unloaded position.

9. The anti-whip receiver in claim 8, wherein said link end of said moveable receiver is coupled to said torsion bar through a link arm, said link arm is rotatable about a link arm axis parallel to and spaced from said torsion axis.

10. The anti-whip receiver in claim 9, wherein said rotating axis rotates about said link arm axis when said moveable receiver moves between said loaded and unloaded positions.

11. The anti-whip receiver in claim 9, further comprising an arm pivot located on said link arm axis, said arm pivot extends between first and second sides of said fixed portion.

12. The anti-whip receiver in claim 9, wherein when said moveable receiver is in said unloaded position, said rotating axis is closer to said torsion axis than when said moveable receiver is in said loaded position.

13. The anti-whip receiver in claim 8, wherein said fixed portion has a slot, said sliding end slidably coupled to said fixed portion in said slot.

14. An anti-whip receiver comprising:
a fixed portion for being affixed to a vehicle;
a moveable receiver for receiving a cantilevered accessory, said moveable receiver having a first end rotatably coupled to a link arm, said link arm rotatable with respect to said fixed portion, said moveable receiver having a second end slidably coupled to said fixed portion; and
a torsion portion affixed between said link arm and said fixed portion to resiliently resist rotation of said link arm with respect to said fixed portion.

15. The anti-whip receiver of claim 14, wherein said moveable receiver is moveable between a loaded and unloaded position, said moveable receiver has a receiver plane centered between a top wall and a bottom wall of said moveable receiver, said receiver plane in said unloaded position intersects with said receiver plane in said loaded position at a location outside of said anti-whip receiver.

16. The anti-whip receiver of claim 14, wherein said torsion portion having a transverse torsion tube affixed to said fixed portion at a first side and a second side, a torsion bar resiliently held within said torsion tube and rotatable about a torsion axis, said first and second sides each having a slot spaced from said torsion axis by a first distance and an arm pivot spaced from said torsion axis by a second distance, a torsion arm is affixed to said torsion bar and rotatable therewith.

17. The anti-whip receiver of claim 16, wherein said second distance is greater than said first distance.

18. The anti-whip receiver of claim 14, wherein said moveable receiver is slidably rotatable with respect to said fixed portion between an unloaded position and a loaded position, said first end rotatably coupled to said fixed portion at a rotating axis.

19. The anti-whip receiver of claim 18, wherein said second end is coupled to said fixed portion with a sliding pin residing in a slot, when said link arm rotates with respect to said fixed portion, said rotating axis rotates about an arm pivot and said sliding pin slides in said slot.

20. The anti-whip receiver in claim 19, wherein when said moveable receiver is in said unloaded position, said rotating axis is closer to said torsion portion than when said moveable receiver is in said loaded position.

* * * * *